United States Patent
Chang et al.

(10) Patent No.: US 11,746,848 B1
(45) Date of Patent: Sep. 5, 2023

(54) BUFFER BRACKET

(71) Applicants: Futaijing Precision Electronics (Yantai) Co., Ltd., Yantai (CN); HON HAI PRECISION INDUSTRY CO., LTD., New Taipei (TW)

(72) Inventors: Yu-Sheng Chang, New Taipei (TW); Wen-Bin Huang, New Taipei (TW); Hsiu-Fu Li, New Taipei (TW); Yu-Chih Cheng, New Taipei (TW)

(73) Assignees: Futaijing Precision Electronics (Yantai) Co., Ltd., Yantai (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 18/077,076

(22) Filed: Dec. 7, 2022

(30) Foreign Application Priority Data

Aug. 22, 2022 (CN) .......................... 202222212840.7

(51) Int. Cl.
  *F16F 1/04* (2006.01)
  *B60R 11/02* (2006.01)
  *B60R 11/00* (2006.01)

(52) U.S. Cl.
  CPC ............ *F16F 1/04* (2013.01); *B60R 11/0229* (2013.01); *B60R 2011/0043* (2013.01); *B60R 2011/0084* (2013.01); *F16F 2230/007* (2013.01); *F16F 2232/08* (2013.01); *F16F 2236/04* (2013.01)

(58) Field of Classification Search
  CPC ................... F16F 1/04; F16F 2230/007; F16F 2230/0052; F16F 2232/08; F16F 2236/04; B60R 11/0229; B60R 2011/0043; B60R 2011/0042; B60R 2011/0084
  USPC ......... 248/573, 685, 686, 548, 122.1, 125.1, 248/125.3, 274.1, 295.11, 297.21, 297.31, 248/188.2, 188.3, 188.5
  See application file for complete search history.

(56) References Cited

U.S. PATENT DOCUMENTS

| | | | | |
|---|---|---|---|---|
| 4,872,469 A | * | 10/1989 | Schultz | A61H 3/02 135/69 |
| 5,201,488 A | * | 4/1993 | Hadbavny | B60R 25/005 248/200.1 |
| 5,398,709 A | * | 3/1995 | Lee | A45B 25/08 403/324 |
| 6,315,252 B1 | * | 11/2001 | Schultz | F16M 11/40 108/45 |
| 6,959,902 B2 | * | 11/2005 | Leahy | E01F 9/631 248/548 |
| 7,566,043 B2 | * | 7/2009 | Chen | G06F 1/1616 248/677 |

(Continued)

*Primary Examiner* — Christopher Garft
*Assistant Examiner* — Michael McDuffie
(74) *Attorney, Agent, or Firm* — ScienBiziP, P.C.

(57) ABSTRACT

The disclosure provides a buffer bracket, which comprises a base, a moving part, an elastic buffer and a positioning pin. The base is provided with a group of holes, which comprises a plurality of positioning holes arranged in sequence along the first direction. The moving part is movably fitted to the base along the first direction. The elastic buffer is elastically compressed between the base and the moving part. The locating pin is installed on the moving part. When the moving part moves forward in the first direction relative to the base under external force, the positioning pin is restricted to a certain positioning hole. The beneficial effect of the disclosure is that it can absorb impact energy and avoid rebound.

10 Claims, 6 Drawing Sheets

(56) References Cited

U.S. PATENT DOCUMENTS

| | | | | |
|---|---|---|---|---|
| 8,567,744 B1* | 10/2013 | Mam | .................... | F16M 11/041 |
| | | | | 248/548 |
| 8,920,003 B2* | 12/2014 | Cheng | .................... | F21V 21/03 |
| | | | | 362/369 |
| 9,999,480 B2* | 6/2018 | Oginski | .................. | A61B 90/25 |
| 10,753,586 B1* | 8/2020 | Xu | ....................... | F16C 29/0616 |
| 2009/0152411 A1* | 6/2009 | Tsay | .................... | F16M 11/043 |
| | | | | 248/122.1 |
| 2011/0075423 A1* | 3/2011 | Van De Ven | ........... | F21V 19/02 |
| | | | | 362/249.02 |
| 2013/0075546 A1* | 3/2013 | Peng | ..................... | F16M 11/28 |
| | | | | 248/176.1 |
| 2014/0104806 A1* | 4/2014 | Segar | ................. | F16M 11/046 |
| | | | | 29/401.1 |
| 2014/0283715 A1* | 9/2014 | Sevadjian | ................ | A47B 9/14 |
| | | | | 248/188.5 |
| 2022/0120065 A1* | 4/2022 | Lin | ....................... | E03C 1/0409 |
| 2022/0332259 A1* | 10/2022 | Jordan | ................ | B60R 11/0229 |

\* cited by examiner

BUFFER BRACKET

FIELD

The subject herein relates to support structure, and more particularly to a buffer bracket.

BACKGROUND

For vehicles equipped with vehicle electronic device, such as on-board screen, when the vehicle brakes suddenly or being accidentally impacted, personnel on the vehicle may impact on the vehicle electronic device, causing damage to the personnel or equipment.

SUMMARY OF THE INVENTION

The disclosure is to provide a buffer bracket.

In a first aspect, the disclosure provides a buffer bracket, comprising:

a base provided with a group of holes comprising a plurality of positioning holes arranged in sequence along a first direction; each positioning hole has a guide surface and a stop surface facing each other in the first direction, and the stop surface is located behind the guide surface in a forward direction of the first direction;

a moving part movably fitted to the base along the first direction;

an elastic buffer elastically compressed between the base and the moving part;

a positioning pin mounted on the moving part and elastically pressed against the base in a second direction; the positioning pin is opposite to the group of holes;

when the moving part moves in the forward direction of the first direction relative to the base under an external force, the elastic buffer is compressed, and the guide surface of one of the positioning holes guide the positioning pin moving forward with the moving part in the first direction; and when the moving part is stopped, the positioning pin is limited by the stop surface of the positioning hole where the positioning pin is inserted.

In a second aspect, the disclosure provides a buffer bracket for mounting a vehicle electronic device to a vehicle, comprising:

a base for connecting to the vehicle; the base comprises a first annular wall, and an axis of the first annular wall is parallel to a first direction; the outer peripheral surface of the first annular wall is provided with a plurality of groups of holes distributed circumferentially on the first annular wall; each group of holes comprises a plurality of positioning holes and an end hole, the plurality of positioning holes and the end hole are arranged in sequence along the first direction; each positioning hole has a guide surface and a stop surface facing each other in the first direction, and the stop surface is located behind the guide surface in a forward direction of the first direction; the end hole is located at the front end of the plurality of positioning holes along the first direction, and the end hole is a straight hole extending along a second direction; the second direction and the first direction are parallel to each other or intersect obliquely; an inner side of the first annular wall defines a step hole extending in the first direction, a first step surface is provided on the step hole;

a moving part being able to approach the base forward in the first direction under an external force, the moving part comprising a second annular wall, a first flange and a second flange, the second annular wall being sleeved outside the first annular wall at intervals, the first flange being connected to an end of the second annular wall away from the base and extending toward an inner side of the second annular wall, the first flange defines a second step surface opposite to the first step surface and an end surface of the first annular wall in the first direction; the first flange is provided with a through hole opposite to an end surface of the first annular wall in the first direction; the second flange is connected to an end of the second annular wall near the base, and is sleeved outside the first annular wall at intervals, and defines an annular space with the second annular wall;

an elastic buffer disposed inside the first annular wall and the second annular wall and elastically compressed between the first step surface and the second step surface;

a stud comprising a rod portion and a limit portion connected to an end of the rod portion; the rod portion is connected to an end surface of the base by extending through the through hole in the first direction, and the limit portion is located on a side of the first flange away from the base, and the elastic buffer elastically presses the first flange against the limit portion;

a plurality of positioning pins, wherein the plurality of positioning pins are respectively installed on the second flange and are opposite to the plurality of groups of holes in a one to one relationship; each positioning pin elastically presses against the base in the second direction;

when the moving part moves forward in the first direction relative to the base under the external force, the elastic buffer is compressed, and the guide surface of one of the positioning holes guide the positioning pin moving forward with the moving part in the first direction; and when the moving part is stopped, the positioning pin is limited by the stop surface of the positioning hole where the positioning pin is inserted.

BRIEF DESCRIPTION OF THE DRAWINGS

In order to more clearly explain the technical scheme of the embodiment of the invention, the accompanying drawings in the embodiment will be briefly introduced below. It should be understood that the following accompanying drawings only show some and not all embodiments of the invention, so they should not be regarded as limiting the scope. For those skilled in the art, without paying creative labor, relevant drawings can also be developed from these drawings.

DETAILED DESCRIPTION

The technical scheme in the embodiment of the application will be described in combination with the attached drawings in the embodiment of the application. Obviously, the described embodiments are only part of the embodiments of the application, not all embodiments.

It should be noted that when an element is said to be "fixed to" another element, it can be directly on another element or there can be an intervening element. When a component is "connected" to another component, it can be directly connected to another component or there may be intermediate components at the same time. When a component is "set on" another component, it can be set directly on another component or there may be intervening components at the same time. The terms "vertical", "horizontal", "left", "right" and similar expressions used in this paper are for illustrative purposes only.

Unless otherwise defined, all technical and scientific terms used herein have the same meanings as those commonly understood by those skilled in the technical field of the application. The terms used in the specification of the application herein are only for the purpose of describing specific embodiments and are not intended to limit the application. The term "and/or" as used herein includes any and all combinations of one or more related listed items.

Some embodiments of the present application are described in detail. Without conflict, the following embodiments and features in the embodiments can be combined with each other.

Embodiments of Disclosure

Figure 1:
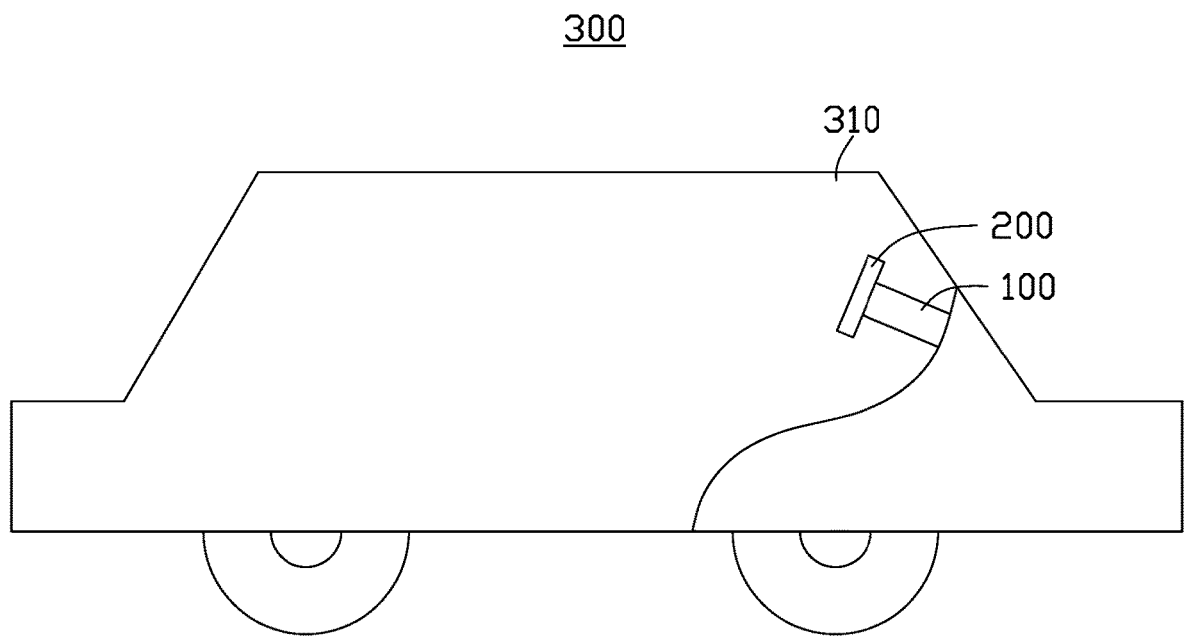
FIG. 1 is a schematic diagram of a vehicle equipped with a buffer bracket and a vehicle electronic device according to an embodiment of the disclosure.
Figure 2:
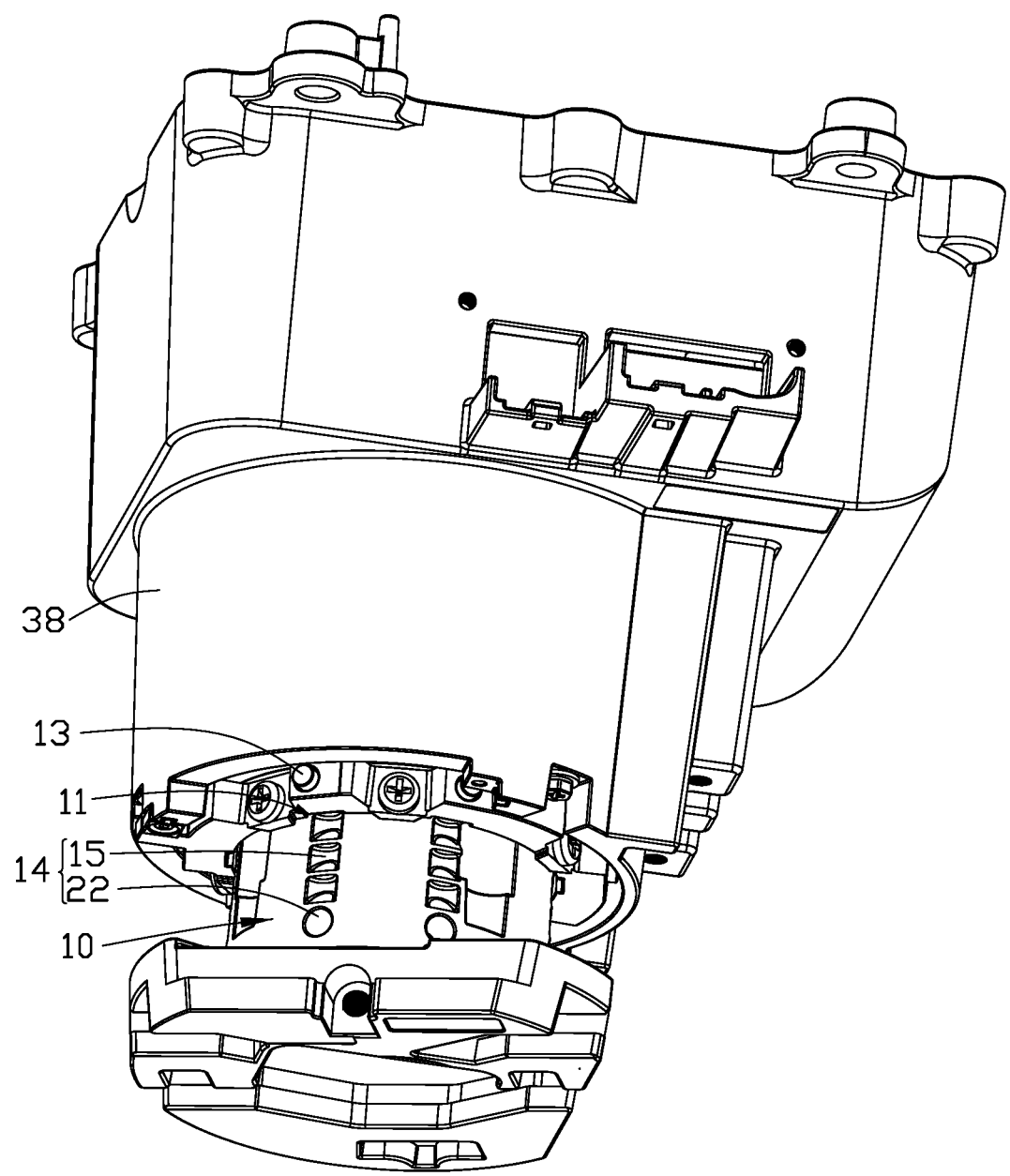
FIG. 2 is a perspective schematic view of the buffer bracket according to an embodiment of the disclosure.
Figure 3:
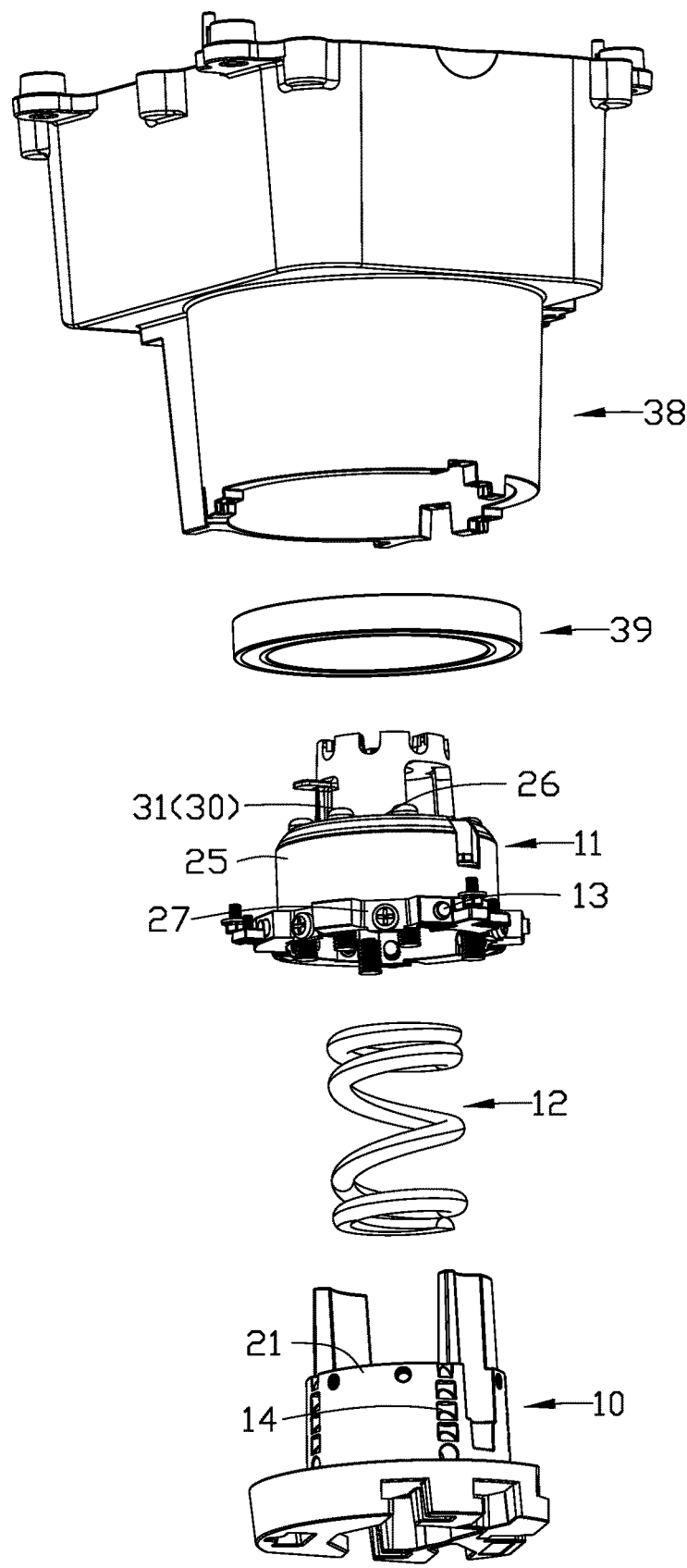
FIG. 3 is an expanded view of the buffer bracket of FIG. 2.
Figure 4:
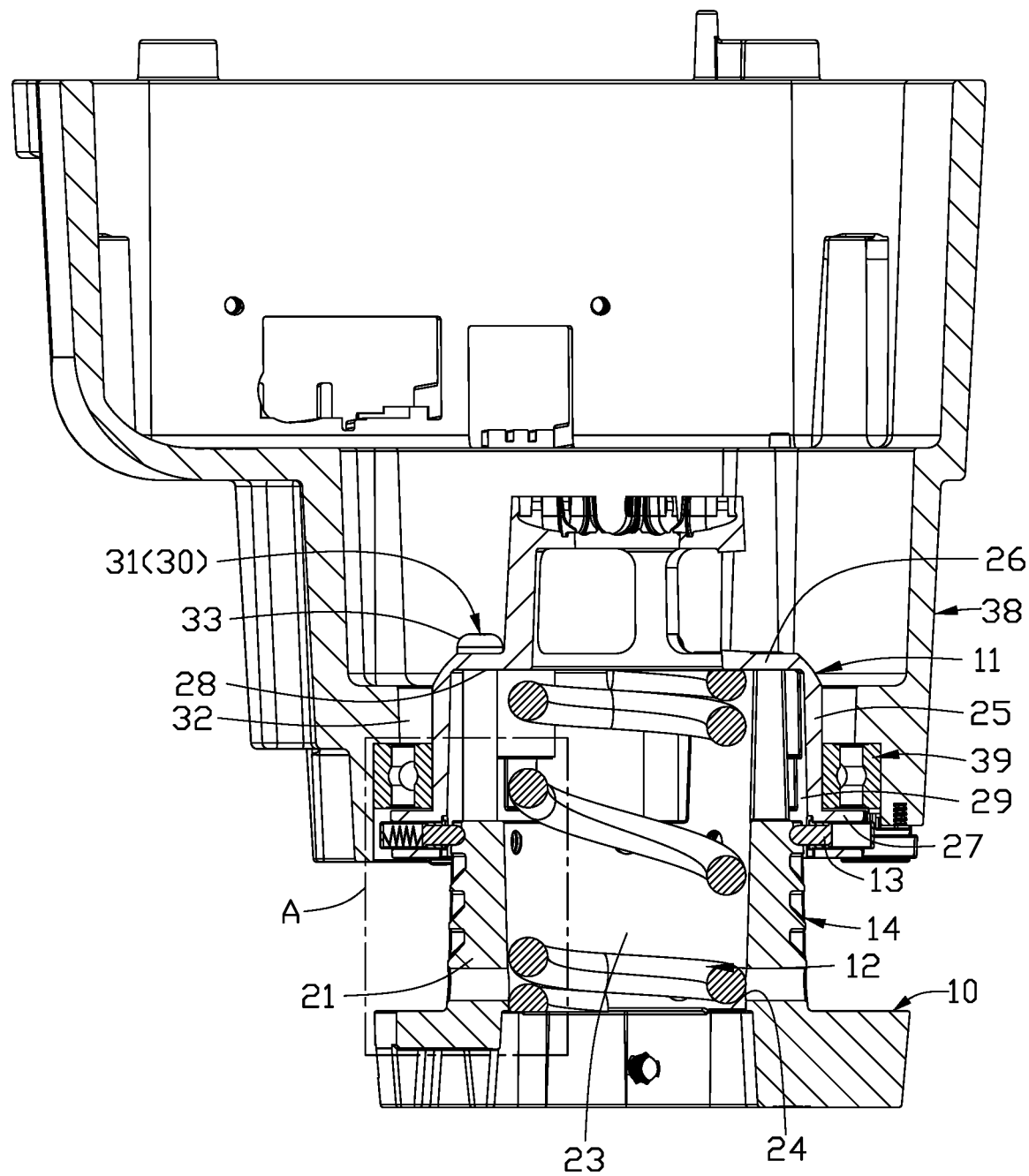
FIG. 4 is a sectional view of the buffer bracket of FIG. 2.

Referring to FIG. 1, the present embodiment provides a vehicle 300, such as a fuel vehicle or an electric vehicle, equipped with a vehicle electronic device 200, such as a smart screen. The vehicle electronic device 200 may be installed to the vehicle 300, for example, at the cab of the vehicle 300, for providing road condition information and the like for the driver.

The driver or the passenger may collide with the vehicle electronic device 200 when the vehicle 300 is suddenly braked or accidentally collided.

The embodiment provides a buffer bracket 100, which is fixed to the vehicle 300 and used to install the vehicle electronic device 200. When the vehicle electronic device 200 is impacted, the buffer bracket 100 can absorb the energy generated by the impact, and the vehicle electronic device 200 can retreat to a certain position according to the impact strength without rebound. Specific implementation will be given below.

Referring to FIG. 2 to FIG. 5, the buffer bracket 100 comprises a base 10, a moving part 11, an elastic buffer 12, and a positioning pin 13. The base 10 is used for mounting to the vehicle 300, and the moving part 11 is movably fitted to the base 10 and used for mounting the vehicle electronic device 200. The elastic buffer 12 is elastically compressed between the base 10 and the moving part 11. The positioning pin 13 is installed on the moving part 11, and the positioning pin 13 can compress the elastic buffer 12 together with the moving part 11, and then the positioning pin 13 is locked at a certain position of the base 10.

The fixing base 10 is provided with a group of holes 14 comprising a plurality of positioning holes 15 arranged in sequence along the first direction 18. Each positioning hole 15 has a guide surface 16 and a stop surface 17 facing each other in the first direction 18. In forward direction 20 of the first direction 18, the stop surface 17 is located behind the guide surface 16. On the contrary, in backward direction 20a of the first direction 18, the stopper surface 17 is located in front of the guide surface 16. Optionally, the base 10 comprises a first annular wall 21 whose axis is parallel to the first direction 18. A plurality of groups of holes 14 are defined on an outer circumferential surface of the first annular wall 21, and the plurality of groups of holes 14 are distributed circumferentially on the first annular wall 21. Each group of holes 14 comprises a plurality of positioning holes 15 and an end hole 22 arranged in sequence along the first direction 18. The positioning hole 15 has a guide surface 16 and a stop surface 17 facing each other in the first direction 18. In the forward direction 20 of the first direction 18, the stop surface 17 is located behind the guide surface 16. The end hole 22 is located at an end of the plurality of positioning holes 15 in the forward direction 20 of the first direction 18. The end hole 22 is a straight hole extending along the second direction 19, wherein the straight hole may be a cylindrical hole. Wherein, the second direction 19 and the first direction 18 are parallel to each other or intersect obliquely. The inner side of the first annular wall 21 defines a step hole 23 extending in the first direction 18, and the step hole 23 has a first step surface 24.

Figure 5:
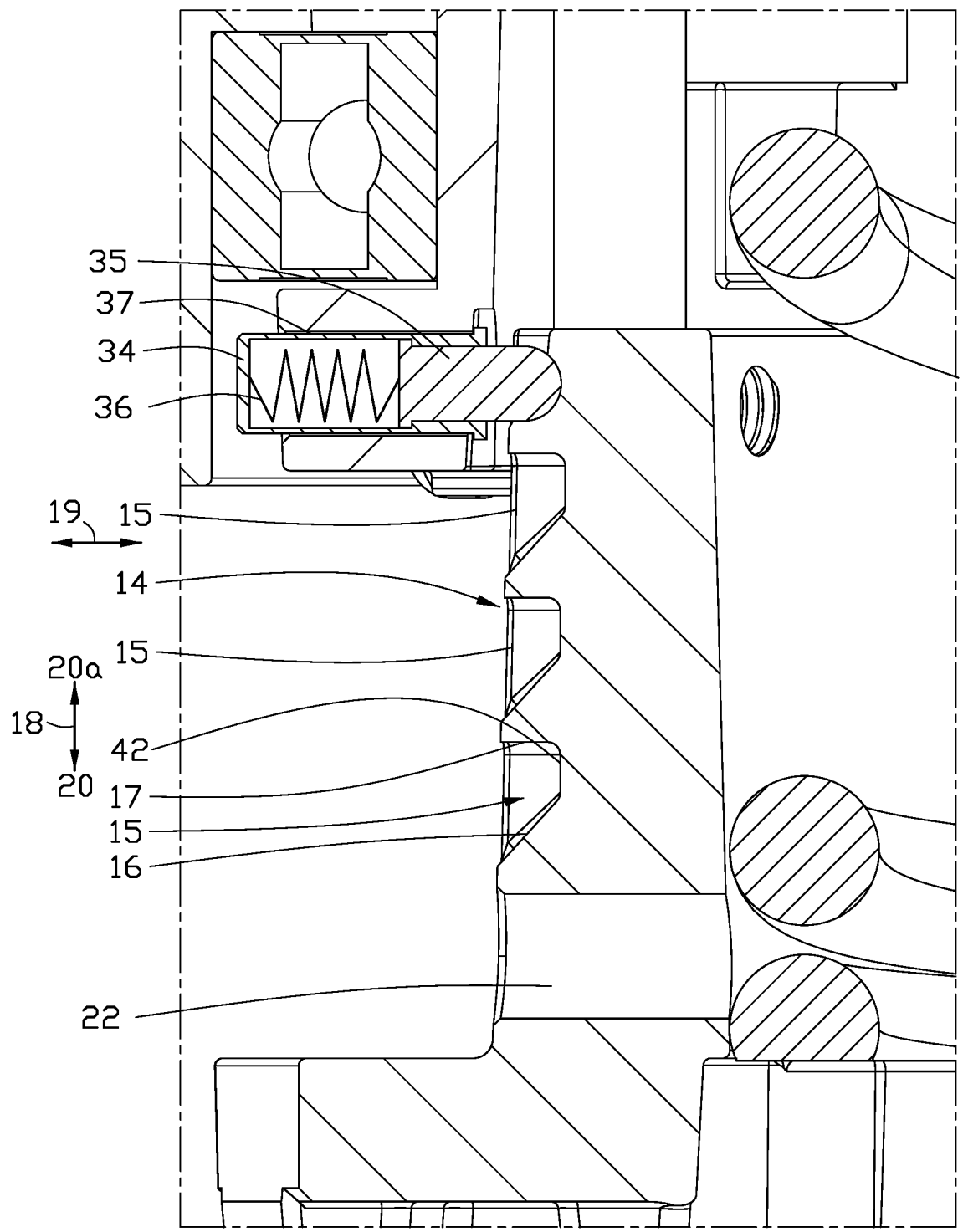
FIG. 5 is a view of a region labeled A in FIG. 4.
Figure 6:
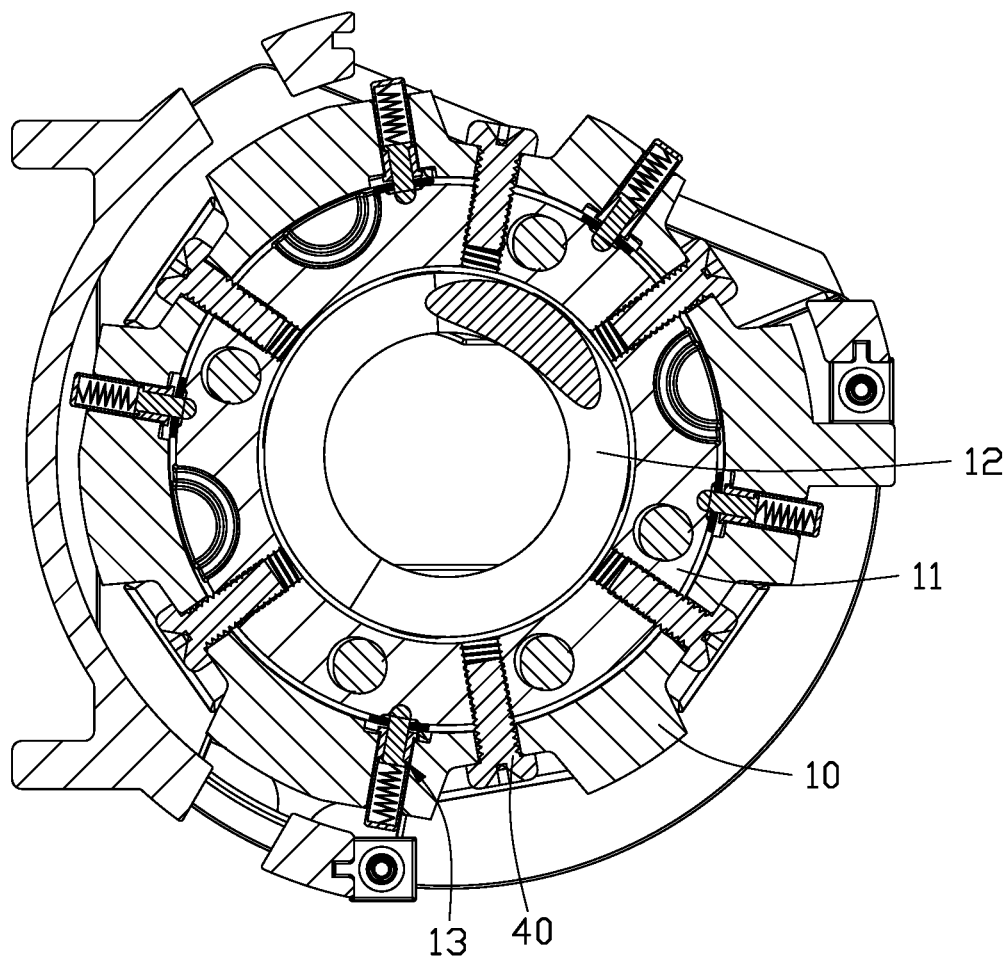
FIG. 6 is another sectional view of the buffer bracket of FIG. 2.

Alternatively, the guide surface 16 is an inclined surface relative to the first direction, and in the forward direction 20 of the first direction 18. The stop surface 17 is a vertical surface perpendicular to the first direction 18. As shown in FIG. 5, the section of the positioning hole 15 in the plane defined by the first direction 18 and the depth direction of the positioning hole 15 is a right angled trapezoid, the right angled side of the right angled trapezoid defines the stop surface 17, and the inclined side of the right angled trapezoid defines the guide surface 16.

The moving part 11 is movably fitted to the base 10 along the first direction 18, and can approach the base 10 along the forward direction 20 of the first direction 18 under the impact of external force. The moving part 11 comprises a second annular wall 25, a first flange 26 and a second flange 27. The second annular wall 25 is sleeved outside the first annular wall 21 at intervals. The first flange 26 is connected to an end of the second annular wall 25 away from the base 10 and extends inward of the second annular wall 25. The first flange 26 defines a second step surface 28 opposite to the first step surface 24 and an end face of the first annular wall 21 along the first direction 18. The first flange 26 is provided with a through hole opposite to an end face of the first annular wall 21 along the first direction 18. The second flange 27 is connected to an end of the second annular wall 25 near the base 10, and is sleeved outside the first annular wall 21 at intervals, and defines an annular space 29 with the second annular wall 25.

The elastic buffer 12 is elastically compressed between the base 10 and the moving part 11 for absorbing the impact energy formed between the base 10 and the moving part 11 by an external force. Alternatively, the elastic buffer 12 is a compression spring elastically compressed between the first step surface 24 and the second step surface 28, and is used to provide an elastic force for relatively separating the base 10 and the moving part 11.

In this embodiment, the buffer bracket 100 further comprises a plurality of stoppers 30. Each stopper 30 is a stud 31, which is connected to the base 10, and the moving part 11 is connected to the stud 31 and can limit the limit position of the moving part 11 away from the base 10. Optionally, the stud 31 comprises a rod portion 32 and a limit portion 33 connected to an end of the rod portion 32. The rod portion 32 is connected to an end face of the base 10 by extending through the through hole in the first direction 18, and the limit portion 33 is located on a side of the first flange 26 away from the base 10. The elastic buffer 12 elastically presses the first flange 26 against the limit portion 33.

The positioning pin 13 is mounted on the moving part 11 and elastically presses against the base 10 along the second direction 19. The positioning pin 13 is opposite to the group of holes 14. Optionally, there are a plurality of positioning pins 13, and the plurality of positioning pins 13 are respectively mounted on the second flange 27 and are opposite to the plurality of groups of holes 14 in a one to one relationship. The positioning pins 13 elastically presses against the base 10 in the second direction 19.

In this embodiment, when the moving part 11 is impacted by an external force and moves in the forward direction 20 of the first direction 18 relative to the base 10, the elastic buffer 12 absorbs the impact energy to increase the elastic potential energy, and the guide surface of one of the positioning holes guide the positioning pin 13 moving forward with the moving part 11 in the forward direction 20 of the first direction 18. When the moving part 11 is stopped, the positioning pin 13 is limited by the stop surface 17 of the positioning hole 15 where the positioning pin 13 is inserted.

The buffer bracket 100 in the embodiment can absorb energy by the elastic buffer 12 under the impact of external force, and the guiding effect of the guiding surface 16 of the positioning hole 15 of the group of holes 14 and the stopping effect of the stop surface 17 can stop the positioning pin 13 at a positioning hole 15 of the group of holes 14 according to the impact energy of external force, thereby locking the moving part 11 at a certain to reduce or avoid the possibility that the elastic buffer 12 reversely releases the energy absorbed and causes the moving part 11 to rebound and cause injury.

In this embodiment, optionally, a cross-section of the end hole 22 is larger than a cross-section of the positioning pin 13, so that when the positioning pin 13 moves to a place opposite to the end hole 22, it is elastically extendable into and limit the end hole 22 and/or the positioning pin 13 is detached from the moving part 11 and enters the end hole 22 in the second direction 19.

In this embodiment, optionally, the outer peripheral surfaces of the moving part 11 and the first annular wall 21 are spaced apart from each other to define the annular space 29. The moving part 11 is supported by the base 10 through the plurality of positioning pins 13, and the moving part is deflectable in the annular space 29 relative to the base 10, so that an angle between a central axis of the moving part and a central axis of the base is variable.

In this embodiment, the positioning pin 13 comprises a shell 34, a pin 35, and a support spring 36. An end of the pin 35 is provided in a hemispherical shape for abutting against the base 10 and fitting with the positioning hole 15. The other end of the pin 35 is telescopically sleeved in the shell 34 and is supported to the shell 34 by a support spring 36. The second flange 27 is provided with a mounting hole 37 penetrating along the second direction 19. The shell 34 is slidably mounted on the mounting hole 37, and a side of the shell 34 close to the fixed base 10 is provided with an enlarged first flange 26. The first flange 26 can prevent the shell 34 from withdrawing from the mounting hole 37 along the second direction 19 toward the side away from the base 10. The bottom surface 42 of the positioning hole 15 is a semicircular cylindrical surface whose axis is parallel to the first direction 18, and the guide surface 16 and the stop surface 17 are respectively connected to both axial ends of the semicircular cylindrical surface. A radius of the hemispherical of the end of the positioning pin 13 abutting against the base 10 is smaller than a radius of the semicircular cylinder.

The second flange 27 is connected to an end of the second annular wall 25 near the base 10, and is sleeved at intervals outside the first annular wall 21. The second flange 27 is provided with the mounting hole 37 extending along the second direction 19, and the positioning pin 13 is mounted to the mounting hole 37.

In this embodiment, the buffer bracket 100 may further comprise a mounting bracket 38 and a bearing 39, and the mounting bracket 38 is rotatably connected to an outer periphery of the moving part 11 through the bearing 39. The shape of the mounting bracket 38 may be provided to be suitable for mounting the vehicle electronic device 200. Thus, the mounting bracket 38 and the vehicle electronic device 200 mounted thereon can rotate relative to the moving part 11.

In this embodiment, the vehicle electronic device 200 is mounted on the vehicle 300, such as a cab of the vehicle 300, through the buffer bracket 100. First, when the vehicle electronic device 200 is mounted on the mounting bracket 38 of the buffer bracket 100, it can rotate circumferentially with the mounting bracket 38 relative to the moving part 11 to adjust the angle of the vehicle electronic device 200 for convenient use. When installed, the moving part 11 is supported to the base 10 in the circumferential direction by the plurality of positioning pins 13.

In case of sudden braking or accidental collision of the vehicle 300, if a person in the cab impacts the vehicle electronic device 200, the impact force will move the vehicle electronic device 200, the mounting bracket 38 and the moving part 11 along the forward direction 20 of the first direction 18. At this time, the moving part 11 will compress the elastic buffer 12, convert at least part of the impact energy into the elastic potential energy of the elastic buffer 12, and reduce the speed of the vehicle electronic device 200, the mounting bracket 38 and the moving part 11. During this process, the pin 35 of each positioning pin 13 is elastically pressed against outer surface of the first annular wall 21 under the elastic support of the support spring 36, and moves along the group of holes 14 along with the moving part 11. Guided by the guide surfaces 16, the pin 35 successively passes through several positioning holes 15 until it stops together with the moving part 11 and is limited to a certain positioning hole 15. At this time, although the elastic buffer 12 is still compressed, the moving part 11 and the vehicle electronic device 200 connected thereto will not be bounced by the elastic buffer 12 due to that the pin 35 is locked by the stop surface 17 of the positioning hole 15, avoiding secondary damage.

When the impact force is large enough, the moving part 11 will drive the positioning pin 13 to move forward through all the positioning holes 15 and snap into the end hole 22 to force a final stop. After the moving part 11 is stopped, the positioning pin 13 can be pushed into the end hole 22 along the second direction 19 to release the mutual connection between the moving part 11 and the base 10, and then the buffer bracket 100 can be restored to its initial state.

In addition, when the impact force is eccentric, the moving part 11 can be deflected at a certain angle relative to the base 10 due to the arrangement of the annular space 29 between the moving part 11 and the base 10. At this time, the positioning pins 13 at different positions in the circumferential direction may be stuck at positioning holes 15 at different positions.

Optionally, a plurality of locking screws 40 distributed circumferentially may also be provided between the moving part 11 and the base 10. The plurality of locking screws 40 pass through the moving part 11 along the second direction 19 and are screwed to the base 10 to fix and lock the moving part 11 on the base 10. At this time, the moving part 11 and the base 10 are relatively locked, and the vehicle electronic device 200 is fixedly installed, so that the buffering and energy absorbing effect cannot be realized by relative movement. When it is necessary to restore the buffering and energy absorbing effect of the buffer bracket 100, remove all the locking screws 40 so that the moving part 11 is supported by the base 10 through the plurality of positioning pins 13.

The above embodiments are only used to illustrate the technical solution of the application rather than for limitation. Although the application is described in detail with reference to the above preferred embodiments, those skilled in the art should understand that any modification or equivalent replacement of the technical solution of the application should not deviate from the spirit and scope of the technical solution of the application.

What is claimed is:

1. A buffer bracket, comprising:
a base provided with a group of holes comprising a plurality of positioning holes arranged in sequence along a first direction; each positioning hole has a guide surface and a stop surface facing each other in the first direction, and the stop surface is located behind the guide surface in a forward direction of the first direction;
a moving part movably fitted to the base along the first direction;
an elastic buffer elastically compressed between the base and the moving part;
a positioning pin mounted on the moving part and elastically pressed against the base in a second direction; the positioning pin is opposite to the group of holes;
when the moving part moves in the forward direction of the first direction relative to the base under an external force, the elastic buffer is compressed, and the guide surface of one of the positioning holes guides the positioning pin moving forward with the moving part in the first direction; and
when the moving part is stopped, the positioning pin is limited by the stop surface of the positioning hole where the positioning pin is inserted.

2. The buffer bracket according to claim 1, wherein, the guide surface is an inclined surface relative to the first direction and the stop surface is a vertical surface perpendicular to the first direction.

3. The buffer bracket according to claim 1, wherein, the group of holes further comprises an end hole which is a straight hole extending along a second direction; the end hole is located at the foremost end of the group of holes in the forward direction of the first direction; a cross-section of the end hole is larger than a cross-section of the positioning pin, so that the positioning pin is elastically extendable into and limit the end hole and/or the positioning pin is detached from the moving part and enters the end hole in the second direction when the positioning pin is moved to a place opposite to the end hole.

4. The buffer bracket according to claim 1, wherein the base comprises a first annular wall, and an axis of the first annular wall is parallel to the first direction; a plurality of groups of holes are provided and circumferentially distributed on an outer circumferential surface of the first annular wall;
the moving part is movably sleeved outside the first annular wall;
where the positioning pin comprises a plurality of positioning pins are provided and distributed circumferentially in the moving part opposite to the plurality of groups of holes in a one to one relationship.

5. The buffer bracket according to claim 4, wherein, the moving part and the first annular wall are spaced apart from each other to define an annular space;
the moving part is supported by the base through the plurality of positioning pins and the moving part is deflectable in the annular space relative to the base, so that an angle between a central axis of the moving part and a central axis of the base is variable.

6. The buffer bracket according to claim 5, wherein an end of the positioning pin abutting against the base is hemispherical;
a bottom surface of the positioning hole is a semicircular cylindrical surface whose axis is parallel to the first direction, and the guide surface and the stop surface are respectively connected to both axial ends of the semicircular cylindrical surface;
a radius of the hemispherical of the end of the positioning pin abutting against the base is smaller than a radius of the semicircular cylinder.

7. The buffer bracket according to claim 4, wherein, the first annular wall defines a step hole in the axial direction, the step hole having a first step surface facing the moving part;
the moving part comprises a second annular wall, a first flange and a second flange, the second annular wall is sleeved outside the first annular wall at intervals, the first flange is connected to an end of the second annular wall away from the base, the first flange defines a second step surface opposite to the first step surface in the axial direction; the elastic buffer is a compression spring elastically compressed between the first step surface and the second step surface;
the second flange is connected to an end of the second annular wall near the base and is sleeved outside the first annular wall at intervals; the second flange is provided with a mounting hole extending in the second direction, and the positioning pin is mounted on the mounting hole.

8. The buffer bracket according to claim 7, wherein the buffer bracket further comprises a stopper, which comprises a rod portion and a limit portion connected to an end of the rod portion; the moving part is provided with a through hole, the rod portion is connected to the base by extending through the through hole in the first direction, and the limit portion defines a limit position of the moving part away from the base, and the elastic buffer elastically presses the moving part against the limit portion.

9. The buffer bracket according to claim 8, wherein the buffer bracket further comprises a mounting bracket and a bearing;
the mounting bracket is rotatably connected to an outer periphery of the moving part through the bearing.

10. A buffer bracket for mounting a vehicle electronic device to a vehicle, the buffer bracket comprising:
a base for connecting to the vehicle; the base comprises a first annular wall, and an axis of the first annular wall is parallel to a first direction; the outer peripheral surface of the first annular wall is provided with a plurality of groups of holes distributed circumferentially on the first annular wall; each group of holes comprises a plurality of positioning holes and an end hole, the plurality of positioning holes and the end hole are arranged in sequence along the first direction; each positioning hole has a guide surface and a stop surface facing each other in the first direction, and the stop surface is located behind the guide surface in a forward direction of the first direction; the end hole is located at the front end of the plurality of positioning holes along the first direction, and the end hole is a straight hole extending along a second direction; the second direction and the first direction are parallel to each other or intersect obliquely; an inner side of the first annular wall defines a step hole extending in the first direction, a first step surface is provided on the step hole;

a moving part being able to approach the base forward in the first direction under an external force, the moving part comprising a second annular wall, a first flange and a second flange, the second annular wall being sleeved outside the first annular wall at intervals, the first flange being connected to an end of the second annular wall away from the base and extending toward an inner side of the second annular wall, the first flange defines a second step surface opposite to the first step surface and an end surface of the first annular wall in the first direction; the first flange is provided with a through hole opposite to an end surface of the first annular wall in the first direction; the second flange is connected to an end of the second annular wall near the base, and is sleeved outside the first annular wall at intervals, and defines an annular space with the second annular wall;

an elastic buffer disposed inside the first annular wall and the second annular wall and elastically compressed between the first step surface and the second step surface;

a stud comprising a rod portion and a limit portion connected to an end of the rod portion; the rod portion is connected to an end surface of the base by extending through the through hole in the first direction, and the limit portion is located on a side of the first flange away from the base, and the elastic buffer elastically presses the first flange against the limit portion;

a plurality of positioning pins, wherein the plurality of positioning pins are respectively installed on the second flange and are opposite to the plurality of groups of holes in a one to one relationship; each positioning pin elastically presses against the base in the second direction;

when the moving part moves in the forward direction of the first direction relative to the base under an external force, the elastic buffer is compressed, and the guide surface of one of the positioning holes guides the positioning pin moving forward with the moving part in the first direction; and when the moving part is stopped, the positioning pin is limited by the stop surface of the positioning hole or the end hole where the positioning pin is inserted.

* * * * *